Oct. 27, 1964      R. G. SMITH ETAL      3,154,049
MAGNETIC PRESSURE INDICATOR
Filed Feb. 19, 1962
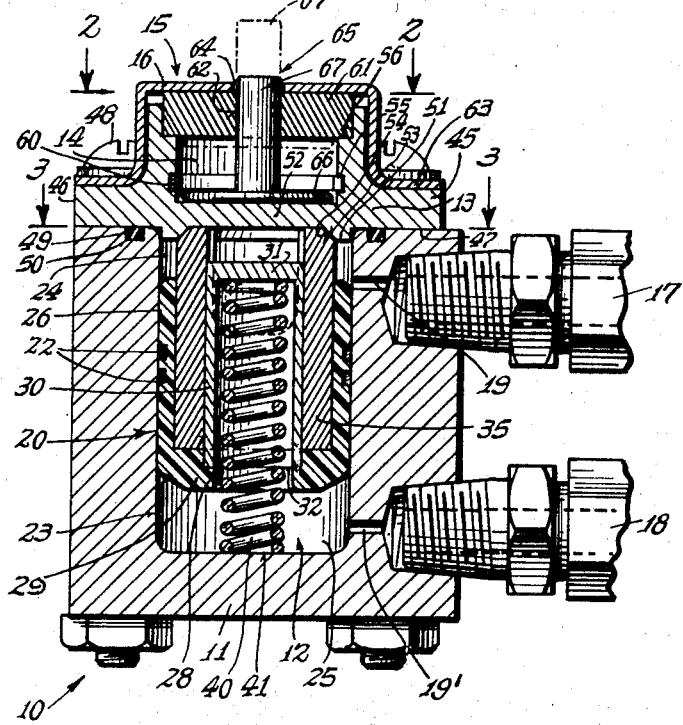
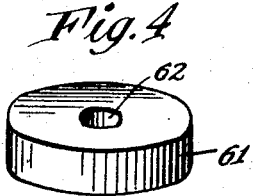
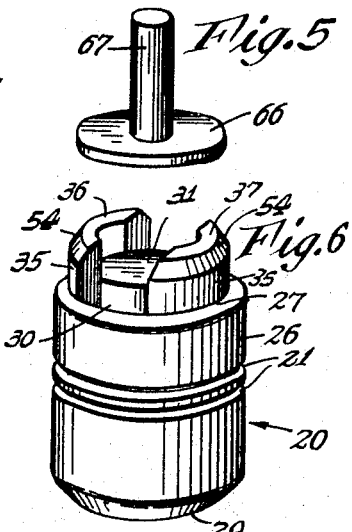
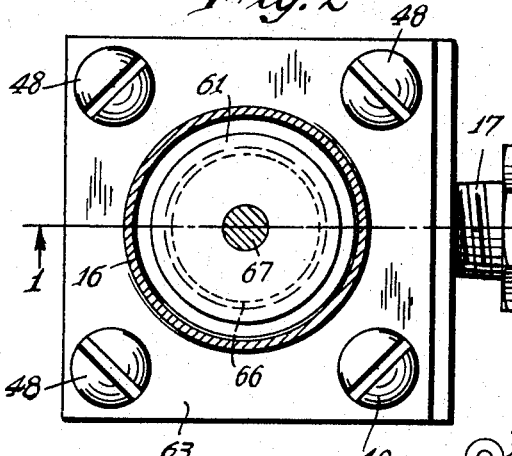
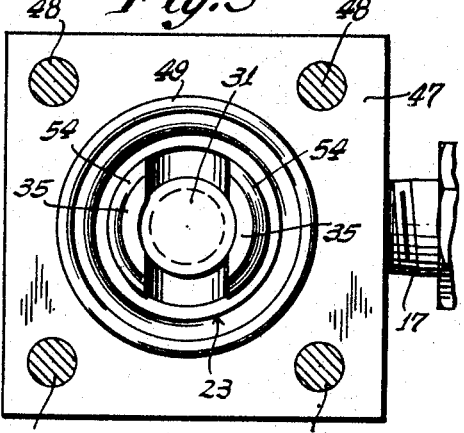
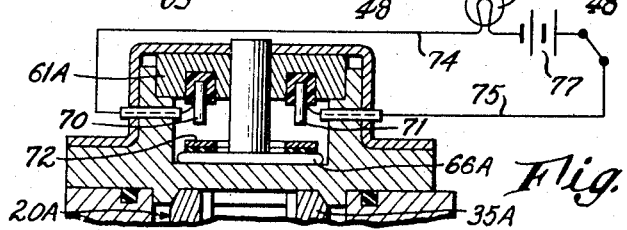
INVENTORS
Richard G. Smith
Joseph B. Berman
BY March and Curtiss
ATTORNEYS

United States Patent Office 3,154,049
Patented Oct. 27, 1964

3,154,049
MAGNETIC PRESSURE INDICATOR
Richard G. Smith, Lake Hiawatha, and Joseph B. Berman, Montclair, N.J., assignors to Screen Products, Inc., Caldwell, N.J., a corporation of New Jersey
Filed Feb. 19, 1962, Ser. No. 174,233
16 Claims. (Cl. 116—70)

This invention relates to fluid pressure indicating devices and more particularly to a device of that character adapted for use in conjunction with a fluid pressure system having an area of high pressure and an area of low pressure to indicate the occurrence of a pressure differential between those areas greater than that of a predetermined value. This application constitutes a continuation-in-part of our copending application Serial No. 114,923, filed June 5, 1961, now abandoned.

A specific application of the invention, by way of illustration, is in conjunction with a hydraulic system wherein fluid such as oil passes through a filter or screen which by its tendency to resist the flow of the fluid creates a difference in the amount of pressure present at opposite sides of the screen, i.e., from high to low in the direction of flow. The pressure drop across the screen increases in proportion to the accumulation of dirt or foreign matter in the screen. Therefore, if a pressure indicator is cut into the system to communicate with the fluid flowing on opposite sides of the screen, and is set to tolerate only a predetermined difference between the pressures in those areas, an indication of an increase in the pressure differential may be obtained. Usually the indication is desired as a warning that the filter screen has accumulated such amount of foreign matter as to require replacement or cleaning for its efficient operation.

The foregoing illustration concerns itself with the general function and characteristics of a differential pressure indicator. An example of a more specific application of such a pressure indicator device or unit is its use in the aircraft and missile fields. In those fields an existing set of specifications requires that the indicator unit must conform to established standards whereby the unit is non-electric and the indicating element thereof is visual when in indicating position and not visible when in non-indicating position. The indicating element in one form of the invention remains in indicating position until by the conscious act of manually resetting it, it is moved to non-indicating position, and in another form of the invention the indicating element is automatically reset. The clearance tolerance of its moving parts in either form must be adequate at the extreme temperatures of —65° F. and +275° F. The indicator unit should be rugged enough to withstand a differential pressure of 4500 p.s.i. and its predetermined non-indicating range may be in the neighborhood of 70±10 p.s.i. in conjunction with a screen for filtering particles larger than 15 microns in size. The indicating element should operate to remain in indicating position even though the indicator unit is subjected to a sudden drop in pressure of from up to 4500 p.s.i. down to 0 p.s.i. Furthermore, the action of the indicator must be sufficiently positive so that it will actuate the indicating element with a positive and definite pop type action and will not be affected by sudden pressure impulses and high frequency vibrations.

With the foregoing in mind, it is an object of the present invention to provide a differential pressure indicator for general or specific use which is simple in construction and assembly, economical to manufacture, and accurate in its operation.

An object of this invention is to provide a differential pressure indicator which must be manually reset.

Another object of this invention is to provide modified differential pressure indicator that can be automatically reset.

Another object of the invention is to provide a differential pressure indicator which has a minimum of movable parts subject to a minimum of wear.

A further object of the invention is to provide a differential pressure indicator wherein the parts thereof comprise an assembly of components, whereby if necessary individual components only may have to be replaced.

Still another object is to provide a differential pressure indicator including a minimum of components which are subject to fatigue deterioration, whereby positive and consistently accurate operation is assured without the need for frequent inspection.

These and other objects, and features of the present invention, will be clear to those individuals skilled in the art from a study of the preferred embodiment of the invention shown in the drawings and the detailed description thereof which follows.

In the accompanying drawings, the invention has been shown merely by way of example and in preferred form and obviously many variations and modifications may be made therein and in its mode of application which will still be comprised within its spirit. It is to be understood, therefore, that the invention is not limited to any specific form as embodiment, except insofar as such limitations are set forth in the appended claims.

Referring to the drawings:

FIG. 1 is a vertical section taken along line 1—1 on FIG. 2 showing the structure of a pressure indicator made in accordance with the present invention;

FIG. 2 is a plan view, partly in section, taken on the line 2—2 looking in the direction of the arrows in FIG. 1;

FIG. 3 is a view similar to FIG. 2, taken on the line 3—3 looking in the direction of the arrows in FIG. 1;

FIG. 4 is a perspective view of the fixed magnet shown in FIG. 1;

FIG. 5 is a perspective view of the indicating element shown in FIG. 1;

FIG. 6 is a perspective view of the movable piston shown in FIG. 1; and

FIG. 7 illustrates a modified form of the indicating element.

The pressure indicator device 10 as shown in FIGS. 1 to 6 of the drawings comprises a body 11 formed with a cylindrical pressure chamber 12 to which there is secured in fluid tight relation a frame structure including a cap 13 formed with a cylindrical chamber 14 adapted to house an indicating mechanism 15, and a cover 16 provided to overlie the cap 13 to enclose the indicating mechanism within the chamber. Two fluid conduits 17 and 18 are connected to the body 11 to communicate each through drill holes or bores 19, 19' with the chamber 12, the uppermost conduit 17 leading to a high pressure area and the lowermost conduit 18 leading to a low pressure area in a fluid pressure system (not shown).

A piston 20 is arranged within the chamber 12 in the body 11 to slide therein from an upper position in which it is shown in FIG. 1 toward the bottom of the chamber 12, and the periphery of the piston 20 has formed in it a pair of grooves 21 (FIG. 6) each adapted to accommodate a gasket or sealing ring 22 which makes an effective fluid-tight seal between the piston 20 and the inner surface or cylinder wall 23 of the chamber 12 thus, in effect, dividing the chamber 12 into two separate fluid-tight compartments 24 and 25. As shown in FIGS. 1 and 6, the piston 20 comprises a cylindrical outer skirt 26 which is open at the top, as at 27, and formed with a centrally located aperture 28 in its bottom wall or piston head 29. Within the piston 20 and concentric with the skirt 26, there is arranged a cylindrical casing 30 having an outside diameter considerably less than the inside diameter of the skirt 26 and an inside diameter substantially equal to that of the aperture 28 in the piston head 29. The top of the casing 30 is closed by a wall 31 and the edge of the casing at the open bottom end thereof seats in a recessed and shouldered portion 32 formed in the piston head 29, to which it is secured. A permanent magnet 35 is fixedly positioned within the space provided between the inside wall of the skirt 26 and the outside wall of the casing 30, with the upper, spaced-apart ends 36 and 37 of the magnet 35 extending a substantial distance above the edge of the top 27 of the skirt and the top wall 31 of the casing 30. The piston 20 is mounted in the chamber 12 on a compression spring 40, one end of which bears against a wall 41 of the body 11 defining the bottom of the chamber 12 and the opposite end of which bears against the inner surface of the top wall 31 of the casing 30, the spring 40 being of appropriate length normally to maintain the piston 20 in its extreme upper position under a predetermined force.

The cap 13 is formed with a base 45 comprising an annular rim 46 adapted to seat tightly on the top edge 47 of the body 11 to which it is held by bolts 48, a fluid-tight seal being effected by the provision of a gasket or sealing ring 49 seated in an annular groove 50 formed in the edge 47 of the body. The base 45 of the cap 13 is formed on its under surface with a circular boss 51 which enters the open top of the chamber 12 and serves to locate the cap 13 on the body 11. Within the area defined by the boss 51 the base 45 of the cap 13 comprises a relatively thin partition 52 which merges with the boss to provide a beveled surface 53 against which correspondingly beveled surfaces 54 on the ends of the magnet 35 abut when the piston 20 is in its extreme upper position.

In the present instance the partition 52 forms the bottom of the chamber 14, which is preferably circular in cross-section. A short distance above the partition 52 the inner wall of the chamber 14 is formed with an annular recess 55 and inward from its open top edge said inner wall is recessed to form a shoulder 56. The recess 55 accommodates a bimetallic strip 60, whose function will be set forth hereinafter, and a circular magnet 61 formed with a centrally located aperture 62 is seated upon the shoulder 56 and held thereon in fixed position by the cover 16, which extends over the top of the cap 13, down the sides thereof and terminates in an annular flange 63 drilled to accommodate the bolts 48 which pass therethrough to clamp it firmly in position. The cover 16 is formed with a centrally located aperture 64 of substantially the same diameter as, and in alignment with, the aperture 62 in the magnet 61.

An indicating element 65 comprises an armature 66 (FIGS. 1 and 5) made of magnetic material such as iron or steel and having a circular stem or rod 67 of non-magnetic material or the like formed integrally therewith or secured thereto. The armature 66 is preferably in the form of a thin flat-faced disc and the stem 67 is secured thereto in concentric relation to extend at a right angle to one face thereof. The indicating element 65 is mounted in the cap 13 merely by being inserted therein with the armature 66 in the chamber 14 and the stem 67 extending through the aligned apertures 62 and 64 in the magnet 61 and cover 16 respectively. When the indicating element 65 is in the full line or non-indicating position shown in FIG. 1, the stem 67 is substantially hidden within the cap 13, and it is movable upward to the dotted line or visual indicating position under the influence of the magnet 61. It should be noted that according to the present invention the indicating element 65 is of very simple construction, comprising a component formed of magnetic material to which there is secured a stem, and the element is mounted in the indicator device 10 for free-floating movement.

The bimetallic element 60 is a conventional type and is arranged in the recess 55 in the cap 13 to have a portion thereof move into and out of a position overlying the disc 66. Its function is to prevent the operation of the indicating element 65 in the event of an excessive pressure differential created in the fluid system during the initial flow of fluid therethrough at a low temperature. Thus, at and above a predetermined temperature the bimetallic element 60 is in an expanded condition whereby it lies wholly or in part within the recess 55 clear of the periphery of the disc 66, and the latter is free to move should it be released by a downward movement of the piston 20 in response to a pressure differential greater than the predetermined value. Below the predetermined temperature the bimetallic element 60 is contracted enough to move inward and overlie the disc 66 to prevent its upward movement. The safety feature thus provided is necessary for the practicable operation of the pressure indicator device 10 and, with an adequate tolerance provision, the bimetallic element selected is one which becomes effective at a temperature slightly above that at which the viscosity of the fluid would be decreased to the point where its flow through the filter screen would be so retarded as to build up too great a pressure differential regardless of the dirt condition of the screen and give a false indication of filter clogging.

In the operation of the device, fluid from the high pressure area of the system is conducted through the conduit 17 and bore 19 to the compartment 24 of the pressure chamber 12, wherein it fills the area at the top of the piston 20 between the poles 36 and 37 of the magnet 35. The conduit 18 and its respective bore 19', on the other hand, conduct fluid from the low pressure area of the system into the compartment 25 of the pressure chamber 12. Thus at all times the difference between the pressures in the compartments 24 and 25 being exerted on opposite ends of the piston 20 is the same as the pressure differential at opposite sides of the filter screen. Whatever the difference between the pressure in the compartments 24 and 25 may be normally, it is less than the expansion force of the spring 40 plus the magnetic force by which the magnet 35 abuts the partition 52. Taking the specification called for in the opening statement hereof, the combined spring and magnetic force would be 70±10 p.s.i. Such being the case, whenever the filter screen should become clogged to decrease the volume of flow of the fluid therethrough sufficiently to cause the pressure in the low area to drop and approach a differential of 70±10 p.s.i. above normal (clean screen pressure differential) the piston 20 will begin to move downward. Upon continued downward movement of the piston 20, the attraction of the disc 66 by the magnet 35 decreases until it becomes less than that of the fixed magnet 61, whereupon the disc 66 is pulled upward to the magnet 61 with a pop type action and the indicating element stem 67 is suddenly moved into the dotted line position (FIG. 1) where it remains visually exposed. As already stated, when the filter condition has been corrected the indicating element 65 must be manually reset by pressing down on the stem 67.

In the embodiment of the invention shown in the drawings, FIGS. 1 to 6, the pressure indicator device 10 comprises a component which is at the same time a cap and a housing for the indicating unit 15. Obviously this can be modified as by forming a pressure unit and a separate indicating unit, i.e., the cap 13 could be merely a cover secured to the body 11 and a frame structure or housing mounting the indicating mechanism 15 could be a separate unit mounted on or in relation to the pressure unit. In such case the operation of the pressure unit might not act directly upon the visual indicating element 65 but upon a comparable element which in turn would actuate, or control the actuation of, the visual indicating means.

FIG. 7 illustrates a modified form of the invention. In this form of the invention, the armature is constructed and arranged so as to be automatically reset as the disturbing influence upsetting the piston is corrected and the system is returned to normal operating pressure. The embodiment of FIG. 7 is similar in all respects to the construction described with reference to FIGS. 1 to 6, except that fixed magnet 61A of FIG. 7 has connected thereto a pair of depending electrically insulated contact pins 70 and 71 which are adapted to engage a contact ring 72 located on the back side of armature 66A. Connected to pin contacts 70 and 71 are conductors 74, 75 which connect to a suitable visual indicator, e.g., a lamp 76, and a source 77 of electrical energy such as a battery, generator or the like. If guide means are provided to prevent rotation of the armature, button contacts may be used in lieu of contact ring 72.

Thus in operation, when the pressure differential approaches a differential of 70±10 p.s.i., the specified differential exemplified herein, the piston 20A will move downwardly or away from the armature 66A. Upon continued downward movement of piston 20A, the attraction of magnet 35A on armature 66A decreases until it becomes less than the flux of fixed magnet 61A action on the armature. Thus when the attraction of magnet 61A on armature 66A becomes greater than that of magnet 35A, the armature 66A is pulled toward magnet 61A with a popping type action. causing pins 70, 71 to engage contact ring 72 to close the circuit to the lamp 76 for energizing the same. Thus when the lamp is lit, an abnormal pressure differential is indicated.

With this construction it is to be noted that the pins 70, 71 greatly limit the overall travel of the armature 66A, when compared with movement of armature 66 in the construction described with reference to FIGS. 1 to 6. Therefore, when the pressure differential is dropped upon the correction of the disturbing influence, the magnet 35A in returning to its normally up position as indicated, will overcome the magnetic flux of magnet 61A thus pulling the armature downwardly toward magnet 35A thereby opening the contacts and deenergizing the circuit to the lamp automatically. When this occurs, the lamp is extinguished, and the armature 66A automatically reset.

The pressure indicator devices, hereinabove described, have been shown in a particular position whereby it has been proper, and for the sake of clarity, to refer to components thereof and the direction of the movement of parts as "top," "bottom," "upwardly," "downwardly," etc. It is pointed out, however, that either indicator device described will operate just as satisfactorily in almost any other position except that if turned through an arc of 180° so that the indicator mechanism 15 were located below the pressure chamber 12, the respective weights of the piston 20 and indicating element 65 might tend to decrease the p.s.i. at which the indicating would occur, but this would be well within the ±10 tolerance.

Variations and modifications may be made without departing from the spirit of the invention or the scope of the appended claims.

Having thus described our invention, what we claim is:

1. In a pressure indicator device adapted for use with a fluid pressure system having a source of high pressure and a source of low pressure and said device having a body defining a pressure chamber containing movable piston means arranged therein to divide the chamber into a high pressure compartment and separate and distinct low pressure compartment and with fluid conducting means connecting said high pressure compartment to said high pressure source and said low pressure compartment to said low pressure source, and means for normally and yieldingly urging said piston means into and maintaining the same in an extreme position of movement in one direction and said piston means being responsive to a change in the pressure differential between said high and low pressure sources to effect its movement in the opposite direction, the combination of a frame structure defining a recess, said frame structure arranged exteriorly of and connected to said body, and an indicating element movably mounted in said recess of said frame structure, said element having a component made of magnetically attractive material and arranged to be set manually in non-indicating position within said frame structure, means creating a magnetic flux throughout said recess in which said indicating element is freely movable within said frame structure to exert a force upon said element to move it into indicating position, and retaining means effective when said movable piston means is in said extreme position to overcome the force of said magnetic flux and retain said indicating element in its manually set position, said retaining means being rendered ineffective by the movement of said movable piston means away from said extreme position.

2. The combination according to claim 1, wherein the indicating element is mounted in said frame structure for free-floating movement between indicating and non-indicating position.

3. The combination according to claim 1, wherein the means creating said magnetic flux comprises a permanent magnet fixedly mounted in said frame structure.

4. The combination according to claim 1, wherein said retaining means comprises a permanent magnet mounted for movement by said movable means and located to subject said indicating element to its maximum flux when the indicating element is in non-indicating position and said movable means is in said extreme position.

5. The combination according to claim 1, wherein the means creating said magnetic flux comprises a first permanent magnet fixedly mounted in said frame structure, and said retaining means comprises a second permanent magnet mounted in said movable means and creating a flux substantially equal in intensity to that of said first magnet, characterized by the fact that said magnets are disposed in opposed spaced-apart relation normally a distance less than the combined radii of their magnetic fields and the magnetically attractive component of the indicating element is disposed in the space between said magnets, and when the indicating element is in non-indicating position and said movable means is in said extreme position said component is closer to the center of flux of said second magnet than it is to the center of flux of said first magnet.

6. A differential pressure indicator adapted for use in conjunction with a fluid pressure system having a source of high pressure and a source of low pressure comprising, in combination, a housing formed with two chambers divided by a relatively thin partition, one of said chambers comprising a fluid pressure chamber and the other of said chambers enclosing an indicating mechanism, movable means dividing said pressure chamber into two fluid-tight compartments, conduit means for connecting one of said compartments to said high pressure source and other conduit means for connecting the other of said compartments to said low pressure source, yielding means normally urging said movable means into close proximity to said partition, a magnetic element mounted in said movable means and located normally to be presented adjacent to said partition, a permanent magnet fixedly disposed in said other chamber in spaced relation to said partition, and an indicating element freely and movably mounted in said other chamber, said element comprising a magnetic component disposed between said fixed magnet and said partition.

7. The combination according to claim 6, wherein said fixed magnet is disposed to create a magnetic flux throughout said other chamber.

8. The combination according to claim 6, wherein said fixed magnet is disposed to create a magnetic flux throughout said other chamber, and said magnetic element is a second permanent magnet creating a flux which passes through said partition, and characterized by the fact that the magnetic flux from the fixed magnet at the surface of said partition within said other chamber is of less intensity than the magnetic flux created at said surface by the second magnet when said movable means presents said second magnet adjacent to said partition.

9. The combination according to claim 6, wherein said housing is formed with an aperture opening from the exterior into said other chamber, and said indicating element comprises a block of magnetic material formed to fit loosely within said other chamber for movement therein and having a stem portion extending into said aperture and having a loose sliding fit therein.

10. In a differential pressure indicator adapted for use in conjunction with a fluid pressure system having a source of high pressure and a source of low pressure, the combination of a fixed permanent magnet, a permanent magnet normally held in definite spaced relation to said fixed magnet and movable in response to a change in the pressure differential between said source to increase said spaced relation, and a freely floatable pressure change indicating element movable between indicating and non-indicating positions and comprising a component of magnetic material disposed between said magnets and movable toward either of them, said component being subject at all times to the magnetic flux of said fixed magnet tending to effect movement of the indicating element into indicating position and being manually movable toward said movable magnet to be subjected to the stronger flux thereof when the movable magnet is in its normal position, thereby to retain said element in non-indicating position.

11. The combination according to claim 10, characterized by the fact that the extent to which the movable magnet can withdraw from its normal position is sufficient to decrease the intensity of its flux on said component to less than the constant intensity of the fixed magnet flux thereon, whereby the latter attracts said component and effects the movement of the indicating element into indicating position.

12. The combination according to claim 10, wherein the fixed magnet is formed with an aperture located between its poles, said indicating element including a rod slidably fixed in said aperture, and said component being a magnetically attractive armature secured to said rod and disposed in facewise opposition to said poles.

13. A differential pressure indicator adapted to be used in conjunction with a fluid pressure system having a source of high pressure and a source of low pressure comprising a housing, a piston disposed in said housing, said piston being movable in response to a change in the pressure differential between said sources of pressure, a magnet mounted on said piston for movement therewith, a fixed magnet facing said movable magnet, an armature disposed between said magnets, said armature being normally attracted to said movable magnet, but subjected at all times to the magnetic flux of said fixed magnet, an electrical circuit including normally open contacts, said contacts being closed by movement of said armature toward said fixed magnet when the flux of said fixed magnet overcomes the flux of said movable magnet, and said armature being movable toward said movable magnet when the latter is moved into position to overcome the flux of said fixed magnet.

14. A differential pressure indicator adapted for use in a fluid pressure system having a source of high pressure and a source of low pressure comprising a housing, a partition dividing said housing into two chambers, piston means movably disposed in one of said chambers and dividing said one chamber into two fluid tight compartments, conduit means connecting one of said compartments in communicating to said high pressure source and a conduit means connecting the other compartment to said low pressure source, yielding means normally urging said piston means toward said partition, a magnet connected to said piston for movement therewith toward and away from said partition and located relative thereto so as to be normally presented to one side of said partition, a fixed magnet disposed on the other side of said partition in spaced relationship thereto, an element formed of a magnetically attractive material movably mounted in said other chamber between said piston magnet and said fixed magnet, normally open cooperating electrical contacts fixed to the opposing surfaces of said fixed magnet and said element, an electric circuit connected to said contacts, an indicator lamp connected in said circuit, said lamp being energized and deenergized by movement of said element to open and close said contacts, said element being shiftable between the partition and fixed magnet in response to the stronger magnetic flux acting thereon.

15. A differential pressure indicator adapted for use in a fluid pressure system having a source of high pressure and a source of low pressure comprising a housing, a partition dividing said housing into two chambers, a piston means movably disposed in one of said chambers for dividing said one chamber into two fluid tight compartments, conduit means connecting one of said compartments in communication to said high pressure source of the system, conduit means connecting the other compartment to said low pressure source of the system, a spring normally urging said piston toward said partition, a permanent magnet mounted on said piston for movement therewith and located relative thereto so as to be normally presented to one side of said partition, a fixed magnet disposed in the other chamber on the other side of said partition in spaced relationship thereto, an armature formed of a magnetically attractive material mounted in free floating relationship in said other chamber for movement between said piston magnet and fixed magnet, cooperating contacts carried by said fixed magnet and said armature, a conductor connected between said contacts to define an electric circuit, an indicator connected in said circuit in series with said contacts, said armature being normally attracted by the stronger magnetic flux of said piston magnet to maintain said contacts open, and said piston magnet being movable away from said partition upon an abnormal increase in the differential pressure of the system so that the attraction thereof on the armature is diminished thereby rendering said armature movable toward said fixed magnet to close said contacts and energize said circuit to actuate said indicator, and said piston magnet being movable toward its normal position upon return to normal operation whereupon the stronger magnetic flux of said piston magnet automatically resets said armature and opens said circuit to deenergize said indicator.

16. A differential pressure indicator adapted for use in a fluid pressure system having a source of high pressure and a source of low pressure comprising a housing, a partition dividing said housing into two chambers, a piston means movably disposed on one of said chambers for dividing said one chamber into two fluid tight compartments, conduit means connecting one of said compartments in communication to said high pressure source of the system, conduit means connecting the other compartment to said low pressure source of the system, a spring normal urging said piston toward said partition, a permanent magnet mounted on said piston for movement therewith and located relative thereto so as to be normally presented to one side of said partition, a fixed magnet disposed in the other chamber on the other side of said partition in spaced relationship to said partition, an armature formed of a magnetically attractive material movably mounted in said other chamber between said piston magnet and fixed magnet, a bimetallic strip disposed within said other chamber operative to prevent the operation of said armature at low temperature, a pair of depending contact pins connected to said fixed magnet, a cooperating contact connected to said armature opposite said pins, a conductor connected to each of said pins to define an electric circuit, a lamp connected in said circuit in series with said contact pins, said armature being normally attracted by the stronger magnetic flux of said piston magnet, and said piston magnet being movable away from said partition upon an abnormal increase in the differential pressure of the system so that the attraction thereof on the armature is diminished thereby rendering said armature movable toward said fixed magnet to close said contacts and energize said circuit to light the lamp, and said piston magnet being movable toward its normal position upon return to normal operation whereupon the stronger magnetic flux of said piston magnet automatically resets said armature and opens the circuit to said lamp.

References Cited in the file of this patent

UNITED STATES PATENTS

| | | |
|---|---|---|
| 2,669,707 | Ehrman | Feb. 16, 1954 |
| 2,843,077 | Leefer | July 15, 1958 |
| 2,935,040 | Steensen | May 3, 1960 |
| 2,942,572 | Pall | June 28, 1960 |
| 3,011,470 | Stoermer | Dec. 5, 1961 |